(12) United States Patent
Coulter et al.

(10) Patent No.: US 8,078,546 B2
(45) Date of Patent: Dec. 13, 2011

(54) METHOD AND PROCESS FOR EMPLOYING A RETIRED WORKFORCE

(75) Inventors: Jeffery R. Coulter, Frisco, TX (US); Thomas L. Hill, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1334 days.

(21) Appl. No.: 11/284,866

(22) Filed: Nov. 22, 2005

(65) Prior Publication Data

US 2007/0118418 A1     May 24, 2007

(51) Int. Cl.
*G06Q 10/00* (2006.01)
(52) U.S. Cl. ........................................ 705/321
(58) Field of Classification Search ........................ 705/1
See application file for complete search history.

(56) References Cited

U.S. PATENT DOCUMENTS

| | | | |
|---|---|---|---|
| 6,381,610 B1* | 4/2002 | Gundewar et al. | 707/104.1 |
| 7,305,392 B1* | 12/2007 | Abrams et al. | 707/9 |
| 2003/0028408 A1 | 2/2003 | RuDusky | |
| 2003/0050816 A1* | 3/2003 | Givens et al. | 705/7 |
| 2005/0216429 A1 | 9/2005 | Hertz et al. | |
| 2007/0118433 A1* | 5/2007 | Bess | 705/26 |

* cited by examiner

*Primary Examiner* — Jami A Plucinski
*Assistant Examiner* — Shaun Sensenig

(57) ABSTRACT

A method, system, and computer program product for assembling a project team is provided. In one embodiment potential team members, such as, for example, retirees from a company, with appropriate qualifications are notified of a project for which team members are needed. The potential team members are identified based on information contained in a database of potential team members. Along with the notification of the project, the potential team members receive a request for bids. The entity then receives a bid from a responding potential team member and compares the bid to bid acceptance criteria. If the bid meets bid acceptance criteria, a bid acceptance is sent to the responding potential team member and the responding potential team member is notified of other members of the project team.

15 Claims, 5 Drawing Sheets

200
Network

METHOD AND PROCESS FOR EMPLOYING A RETIRED WORKFORCE

BACKGROUND OF THE INVENTION

1. Technical Field

The present invention relates generally to computer software and, more particularly, to methods of assembling a team of people.

2. Description of Related Art

Engineers of the baby-boomer class are retiring in mass, leaving the petroleum industry with a serious skill and experience gap. However, there is one significant fact that mitigates this problem: the petroleum engineer workforce has actively embraced information technology since the early 1960's. A unique opportunity exists to use a petroleum industry reliance on information technology to solve the experience gap dilemma. The future engineer will be free to conduct engineering functions in any location from a thin portable device. In many petroleum/energy companies, upstream engineering processes are digital and integrated.

In the near-term, the petroleum engineer has unique requirements for local processing power to perform reservoir simulation, reservoir management, seismic interpretation, geosciences modeling, facilities modeling, and facilities management. These engineering applications consume massive quantities of compute resources and storage resources. The popular engineering applications are being moved from powerful Unix workstation/servers to powerful Wintel workstations. Many application vendors are seriously embracing web-based delivery techniques for selected functions.

However, for the remote engineering to be successful, efficient, and satisfying for both the company and the engineer, new methods of operation must be developed to surround the remote engineer. In particular, there is a need for new methods of integrating people with disparate skills in order for remote engineering to be successful.

SUMMARY OF THE INVENTION

The present invention provides a method, system, and computer program product for assembling a project team. In one embodiment potential team members, such as, for example, retirees from a company, with appropriate qualifications are notified of a project for which team members are needed. The potential team members are identified based on information contained in a database of potential team members. Along with the notification of the project, the potential team members receive a request for bids. The entity then receives a bid from a responding potential team member and compares the bid to bid acceptance criteria. If the bid meets bid acceptance criteria, a bid acceptance is sent to the responding potential team member and the responding potential team member is notified of other members of the project team.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
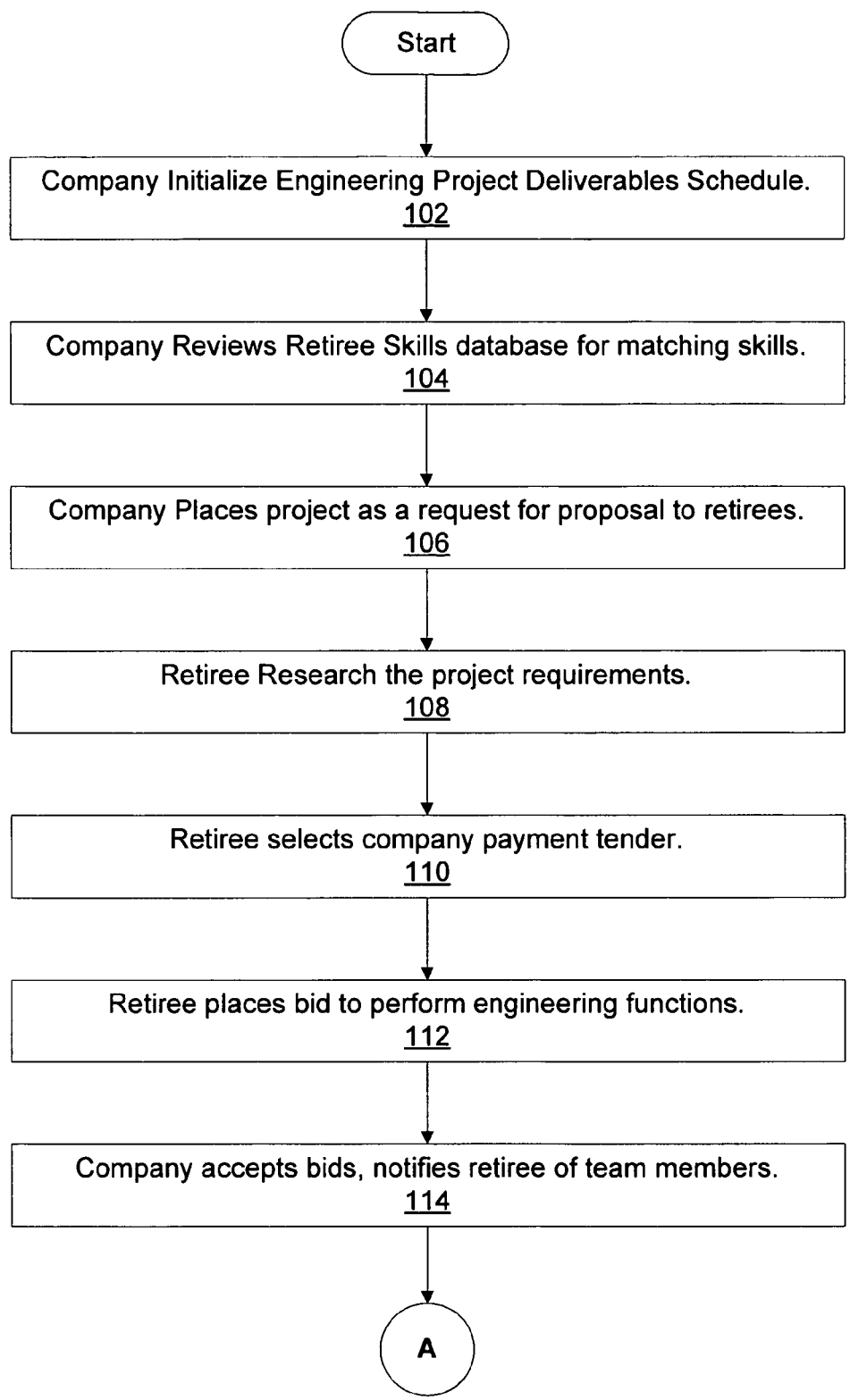
FIGS. 1A-1B depict a remote engineering workflow diagram of high level processes in accordance with one embodiment of the present invention.
Figure 1B:
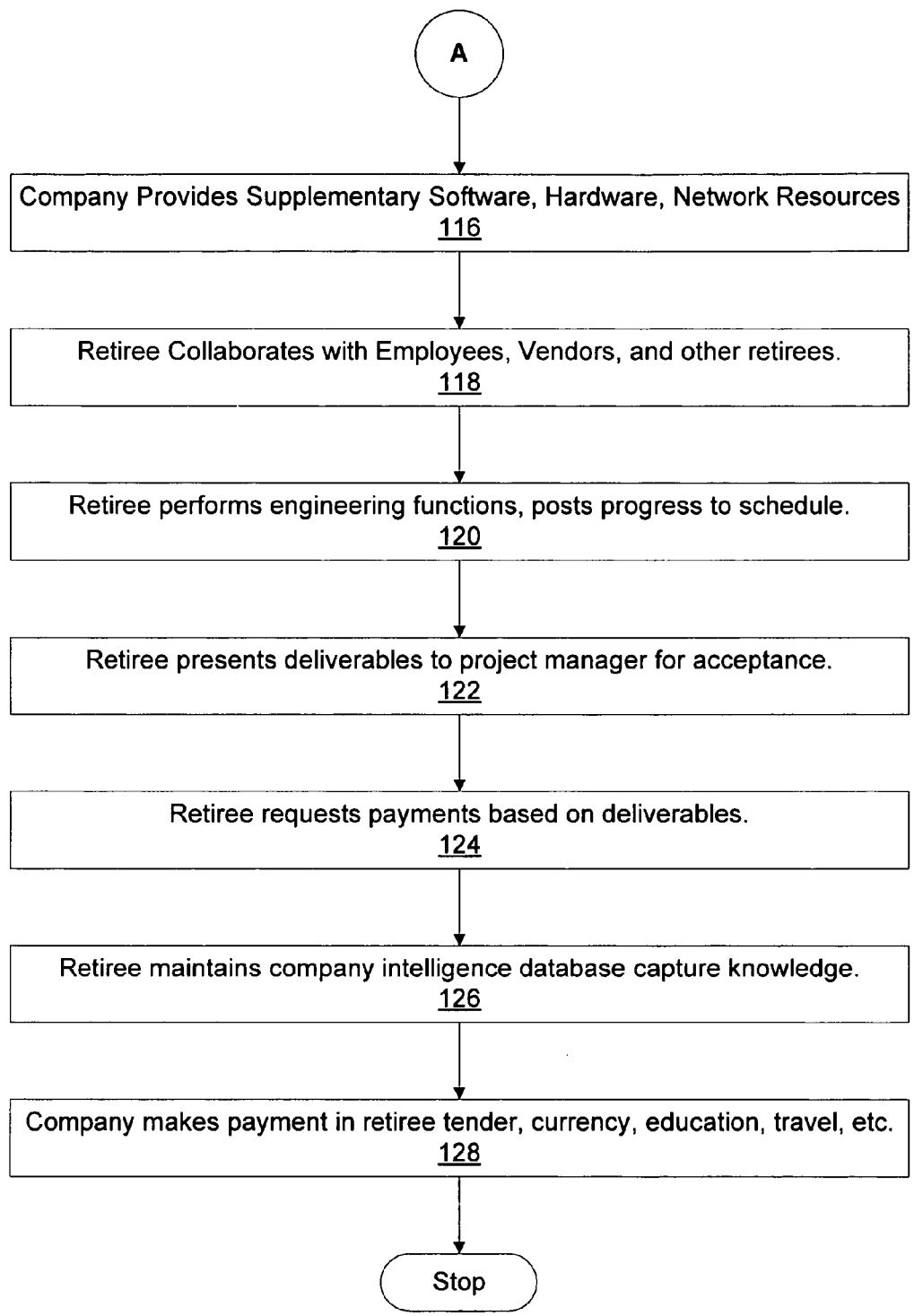

With reference now to the figures and, in particular, with reference to FIGS. 1A-1B, a remote engineering workflow diagram of high level processes is depicted in accordance with one embodiment of the present invention.

In this embodiment, a company, enterprise, or other entity (for simplicity referred to henceforth as simply "company") initializes an engineering project deliverable schedule (step 102) and reviews retiree skills database for matching skills (step 104). The company then places a request for proposal to retirees (step 106). The company may maintain a database of retirees and their skill sets and qualifications.

The appropriate retirees may be notified of the existence of a new project by, for example, e-mail, instant messaging, or other method of notification or, alternatively, may simply become aware of a project by browsing through a company's listing of projects posted on a network. Once aware of a project, a retiree may then research the project requirements by, for example, logging into a web site or otherwise accessing a network enabled system of project requirements (step 108). The project requirements may also identify the method or methods and/or amount and type of compensation or payment tender. The retiree may then select, if the retiree has decided to engage in the project, the desired payment tender option if a satisfactory option exists for the retiree (step 110). The retiree may then place a bid to perform engineering functions where the bid identifies the functions that the retiree will supply and the compensation desired (step 112). In some embodiments, this bid placement may be performed through the selection of options presented to the retiree along with the project requirements by the company's network. However, in some embodiments, it may be possible for the system to provide the retiree with an entry area in which the retiree may enter bid specifications that are not pre-supplied by the company. For example, a text box area may be supplied for the user to type a bid rather than merely selecting from a list of options provided by the company.

In any event, once the retiree places the bid, the company may then review the bid and then, if agreeable, accept the bid and notify the retiree of the team members (step 114). To determine whether to accept the bid, the company may have an individual review the bid or, alternatively, may employ an automated set of selection criteria against which the bid is compared and, if the bid satisfies the selection criteria, the bid is automatically accepted. Acceptance criteria may include such items as, for example, a minimum number of years working experience in a given field, a minimum educational level achieved by the retiree, a maximum number of retirees needed after which no further bids are accepted, maximum compensation, and conflict of interest criteria.

Once the bid is accepted, the company may provide supplementary software, hardware, and/or network resources to the retiree in order for the retiree to properly perform the agreed upon functions (step 116). The retiree then collaborates with the company's employees, vendors, contractors, student interns, and/or other retirees on the specified portion of the project (step 118). The retiree, in collaboration with the other persons on the project, performs engineering functions and posts progress to schedule as specified in the agreement between the retiree and the company (step 120).

Once the project is complete or a sub-stage of the project is complete, the retiree presents deliverables, as defined by agreement between the retiree and the company, to the project manager for acceptance (step 122) and the retiree requests payments based on deliverables (step 124). The retiree also may update and maintain a company intelligence database or captured knowledge indicating the services the retiree has and/or can perform thereby allowing the company to utilize the experience of retired persons in order to efficiently provide solutions and products necessary to allow the company to maintain profitability or increased profitability (step 126). Upon acceptance of the deliverables by, for example, the project manager or someone else in the company responsible for approving deliverables, the company makes payment to the retiree in the amount and type of compensation specified and agreed upon by the company and the retiree (step 128). For example, the company may automatically electronically deposit a certain sum of money to the retiree's bank account upon determination that the deliverables have been supplied by the retiree and accepted by the company.

The specialized home-engineering system outlined above in many embodiments will require technology integration. However, more importantly is the integration of people—linking together disparate subject matter experts (SMEs) so information can flow more or less substantially instantaneously in some embodiments.

The basic idea is to digitize and streamline the "life-cycle" of employees, retirees, and even college students. An Expert Learning Community (ELC) is a community of mentors, mentees, and SMEs that seeks promising ways to learn and collaborate in a transformational way. The ELC model is transformational because it requires a substantial shift in the roles and rules by which companies are traditionally organized. Companies, employees, retirees, colleges and universities, and students become part of an "expert learning community" when they engage in the evolving process of knowledge transfer and capture.

The ELC model seeks to enable the individuals to learn to become more and more expert in the roles of mentor, mentee, and collaborator. The individuals can use new tools to practice the role of searching and discovering—from many sources. This experience in researching can take place again and again, so that expertise can gradually be developed. The individuals can tutor and guide one another as they become more proficient.

The ELC, in conjunction with the improved knowledge capture and collaboration processes, creates the opportunity to reward current employees for the continued contribution of their ideas to the growth of the company. For retirees, they are benefited with the ability to continue to work on projects to the degree that they choose, without returning to the workforce on a full-time basis. In addition, the company is more able to attract, recruit, and train college students in a non-traditional way, which could attract students who would not typically consider entering the petroleum industry.

Rather than rely on traditional temporary employment agencies to supply this shortage of petroleum engineers, a more long-term solution should be applied. Temporary agencies do offer some beneficial services. However, if these agencies were really fulfilling their obligation to provide talented employees, the aging petroleum engineer shortage would not be an issue.

An ELC enables individuals to discuss, reason and apply for certain projects and/or opportunities offered by the company. A company can post all of its projects in community categories, which could include drilling, gas technology, geosciences, oilfield chemistry & corrosion, or well testing for everyone to see and apply.

It is believed that this approach will enable the current workforce to engage in more productive knowledge transfer activities. In addition, this new work environment should be seen as a strategy for employee retention within the petroleum industry. Therefore, the early retirement syndrome may be delayed. This environment is also conducive to attracting graduating college students as it shows a level of innovation by using newer technology in an industry that is perceived to offer lackluster career opportunities.

The system outlined above is presented merely as an example of a method of employing a retired workforce and of a method of integrating and utilizing persons having various skills in order to bring together the appropriate persons to perform a project. However, the method outlined above is not limited to engineering or retirees but may be employed to bring together any persons of varying backgrounds and skills for any type of project both for a profit driven organization and for non-profit, educational, and other types of organizations. As such, the present invention is not limited to the context of retirees or engineering services.

Figure 2:
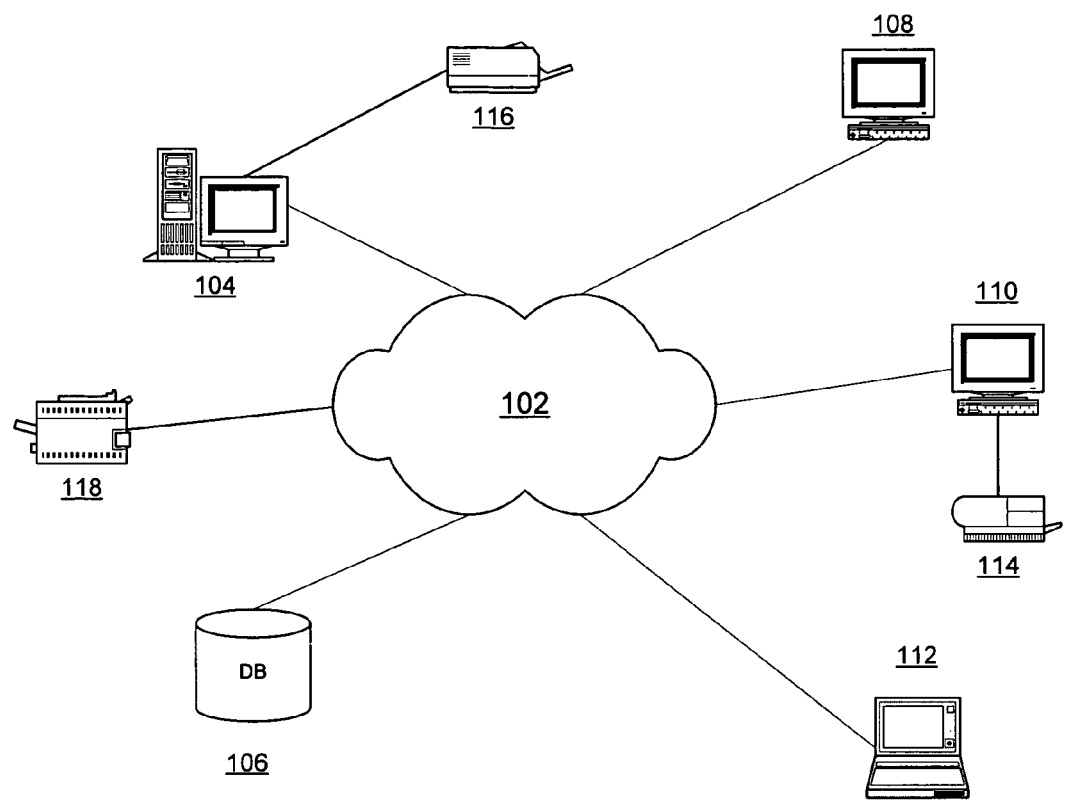
FIG. 2 depicts a pictorial representation of a distributed data processing system in which the present invention may be implemented.

With reference now to the figures, and in particular with reference to FIG. 2, a pictorial representation of a distributed data processing system is depicted in which the present invention may be implemented. Distributed data processing system 200 is an example of a network in which a company may post or otherwise identify projects and allow retirees or other potential project members to view and bid on projects. Distributed data processing system 200 may also provide a system for project members to perform their work and present their deliverables as well as a means for allowing project members to communicate and collaborate with each other.

Distributed data processing system 200 is a network of computers in which the present invention may be implemented. Distributed data processing system 200 contains network 202, which is the medium used to provide communications links between various devices and computers connected within distributed data processing system 200. Network 202 may include permanent connections, such as wire or fiber optic cables, or temporary connections made through telephone connections.

In the depicted example, server 204 is connected to network 202, along with storage unit 206. In addition, clients 208, 210 and 212 are also connected to network 202. These clients, 208, 210 and 212, may be, for example, personal computers or network computers. For purposes of this application, a network computer is any computer coupled to a network that receives a program or other application from another computer coupled to the network. In the depicted example, server 204 provides data, such as boot files, operating system images and applications, as well as project listings and requirements to clients 208-212. The applications provided by server 204 may include work applications required by project team members that are necessary or beneficial to the member in order for the member to perform their duties. Clients 208, 210 and 212 are clients to server 204 and may be utilized by a retiree or potential project team member to review project listings and requirements, place bids, communicate with other team members, perform work functions and present work products or deliverables. Distributed data processing system 200 may include additional servers, clients, and other devices not shown. Distributed data processing system 200 also includes printers 214, 216 and 218. A client, such as client 210, may print directly to printer 214. Clients such as client 208 and client 212 do not have directly attached printers. These clients may print to printer 216, which is attached to server 204, or to printer 218, which is a network printer that does not require connection to a computer for printing documents. Client 210, alternatively, may print to printer 216 or printer 218, depending on the printer type and the document requirements.

In the depicted example, distributed data processing system 200 is the Internet, with network 202 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 200 also may be implemented as a number of different types of networks such as, for example, an intranet or a local area network.

As with all networks, in order to provide appropriate security and confidentiality, various methods and devices may be utilized as are well known to those skilled in the art. For example, distributed data processing system 200 may include or employ, for example, firewalls, encryption methods, Virtual Private Networks (VPNs), authorized user names and passwords, as well as other security measures. The type and number of security measures taken vary by implementation and depend in part upon the security requirements of the particular enterprise.

FIG. 2 is intended as an example and not as an architectural limitation for the processes of the present invention.

Figure 3:
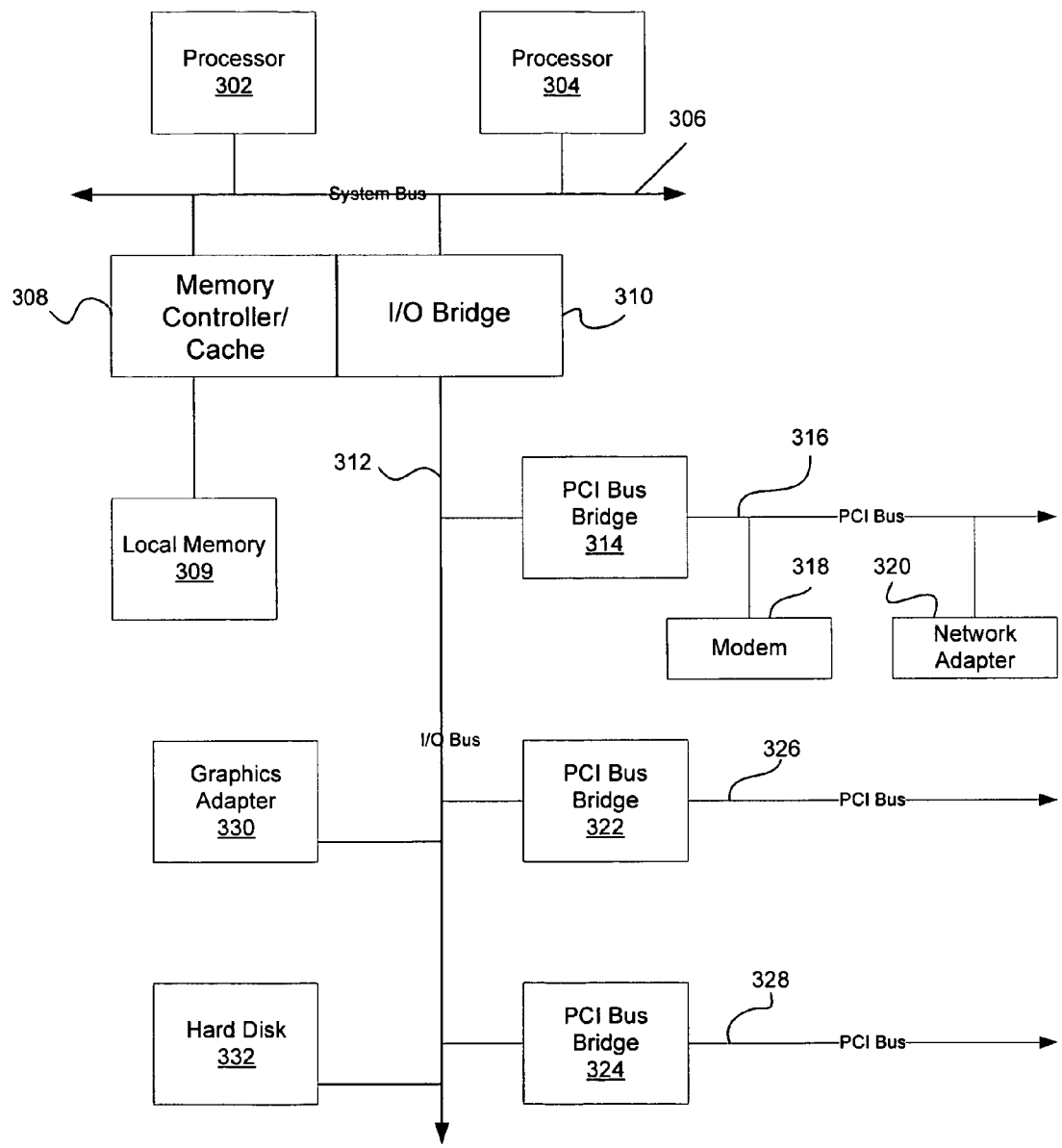
FIG. 3 depicts a block diagram of a data processing system which may be implemented as a server in accordance with the present invention.

Referring to FIG. 3, a block diagram of a data processing system which may be implemented as a server, such as server 204 in FIG. 2, is depicted in accordance with the present invention. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Peripheral component interconnect (PCI) bus bridge 314 connected to I/O bus 312 provides an interface to PCI local bus 316. A number of modems 318-320 may be connected to PCI bus 316. Typical PCI bus implementations will support four PCI expansion slots or add-in connectors. Communications links to network computers 208-212 in FIG. 2 may be provided through modem 318 and network adapter 320 connected to PCI local bus 316 through add-in boards.

Additional PCI bus bridges 322 and 324 provide interfaces for additional PCI buses 326 and 328, from which additional modems or network adapters may be supported. In this manner, server 300 allows connections to multiple network computers. A memory mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Data processing system 300 may be implemented as, for example, an AlphaServer GS1280 running a UNIX® operating system. AlphaServer GS1280 is a product of Hewlett-Packard Company of Palo Alto, Calif. "AlphaServer" is a trademark of Hewlett-Packard Company. "UNIX" is a registered trademark of The Open Group in the United States and other countries.

Figure 4:
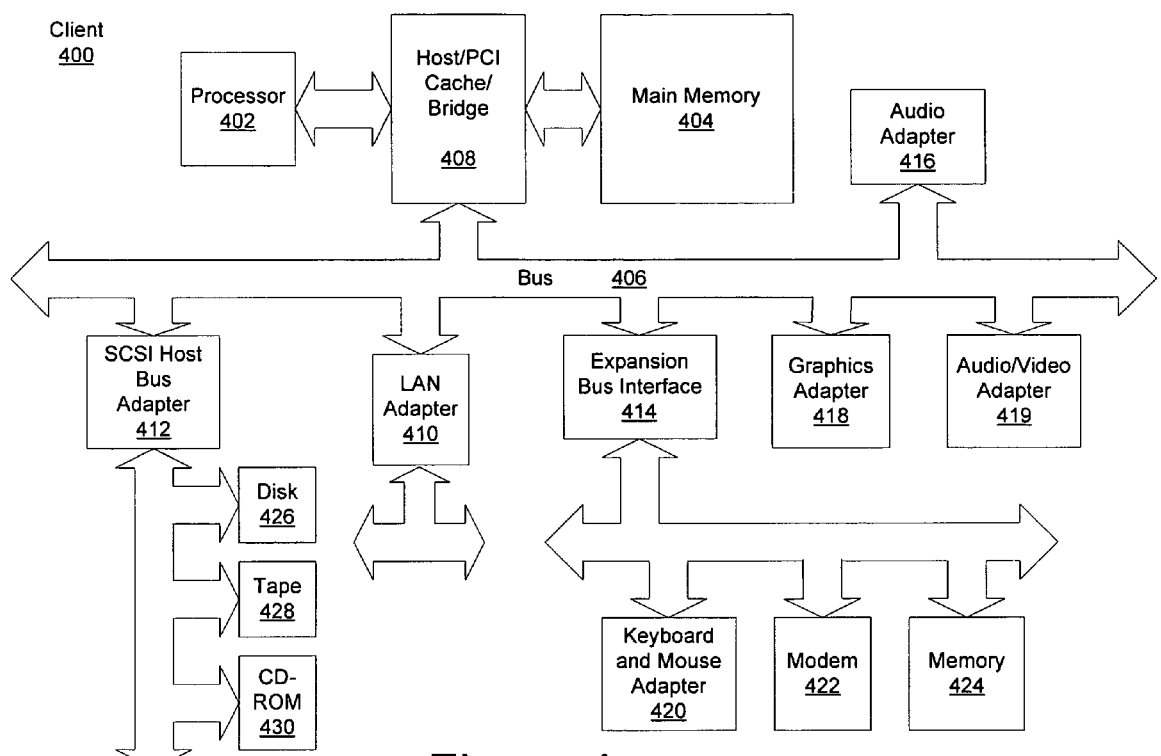
FIG. 4 depicts a block diagram of a data processing system in which the present invention may be implemented.

With reference now to FIG. 4, a block diagram of a data processing system in which the present invention may be implemented is illustrated. Data processing system 400 is an example of a client computer. Data processing system 400 employs a peripheral component interconnect (PCI) local bus architecture. Although the depicted example employs a PCI bus, other bus architectures, such as Micro Channel and ISA, may be used. Processor 402 and main memory 404 are connected to PCI local bus 406 through PCI bridge 408. PCI bridge 408 may also include an integrated memory controller and cache memory for processor 402. Additional connections to PCI local bus 406 may be made through direct component interconnection or through add-in boards. In the depicted example, local area network (LAN) adapter 410, SCSI host bus adapter 412, and expansion bus interface 414 are connected to PCI local bus 406 by direct component connection. In contrast, audio adapter 416, graphics adapter 418, and audio/video adapter (A/V) 419 are connected to PCI local bus 406 by add-in boards inserted into expansion slots. Expansion bus interface 414 provides a connection for a keyboard and mouse adapter 420, modem 422, and additional memory 424. In the depicted example, SCSI host bus adapter 412 provides a connection for hard disk drive 426, tape drive 428, CD-ROM drive 430, and digital video disc read only memory drive (DVD-ROM) 432. Typical PCI local bus implementations will support three or four PCI expansion slots or add-in connectors.

An operating system runs on processor 402 and is used to coordinate and provide control of various components within data processing system 400 in FIG. 4. The operating system may be a commercially available operating system, such as Windows XP, which is available from Microsoft Corporation of Redmond, Wash. "Windows XP" is a trademark of Microsoft Corporation. An object oriented programming system, such as Java, may run in conjunction with the operating system, providing calls to the operating system from Java programs or applications executing on data processing system 400. Instructions for the operating system, the object-oriented operating system, and applications or programs are located on a storage device, such as hard disk drive 426, and may be loaded into main memory 404 for execution by processor 402.

Those of ordinary skill in the art will appreciate that the hardware in FIG. 4 may vary depending on the implementation. For example, other peripheral devices, such as optical disk drives and the like, may be used in addition to or in place of the hardware depicted in FIG. 4. The depicted example is not meant to imply architectural limitations with respect to the present invention. For example, the processes of the present invention may be applied to multiprocessor data processing systems.

Although the present invention has been discussed and described primarily in the context of employing retired petroleum engineers, the present invention is not limited to retired workforces or engineers but may be implemented in any environment in which it is necessary or desirable to bring together people of varying experience and expertise in order to more efficiently design and/or develop process and/or product solutions.

To aid the Patent Office, and any readers of any patent issued on this application in interpreting the claims appended hereto, it is noted that applicant does not intend any of the appended claims to invoke paragraph 6 of 35 U.S.C. §112 as it exists on the date of filing unless the words "means for" are used in the particular claim. Furthermore, none of the description in the present application should be read as implying that any particular element, step, or function is an essential element which must be included in the claim scope: THE SCOPE OF THE PATENTED SUBJECT MATTER IS DEFINED ONLY BY THE ALLOWED CLAIMS. Thus, the extent of legal protection will be determined by the limitations recited in the allowed claims and their equivalents. Unless explicitly recited, other aspects of the present invention as described in this specification do not limit the scope of the claims.

As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a computer system for assembling a project team, the method comprising:
   a computer notifying potential team members with appropriate qualifications of a project for which team members are needed wherein the potential team members are identified based on information contained in a database of potential team members;
   the computer requesting bids from the notified potential team members;
   the computer receiving bids from the potential team members;
   the computer comparing the bids to bid acceptance criteria;
   the computer sending a bid acceptance to the potential team member if the bid of the potential team member meets bid acceptance criteria; and
   notifying a team member corresponding to an accepted bid of the identities of other team members on the project.

2. The method as recited in claim 1, wherein the bid is created by the potential team member selecting at least one option from a presentation of at least two options.

3. The method as recited in claim 1, wherein the bid comprises at least one of a compensation amount, a compensation type, functions to be performed, a skill set of the potential team member, experience level of the potential team member, and an educational background of the potential team member.

4. The method as recited in claim 1, further comprising:
   communicably connecting remote team members to allow for project collaboration between team members.

5. The method as recited in claim 1, further comprising:
   receiving deliverables from the team member; and
   making at least one payment of compensation to the team member.

6. A computer program product in a computer readable media for use in a data processing system for assembling a project team, the computer program product comprising:
   first instructions for notifying potential team members with appropriate qualifications of a project for which team members are needed wherein the potential team members are identified based on information contained in a database of potential team members;
   second instructions for requesting bids from the notified potential team members;
   third instructions for receiving bids from the potential team members;
   fourth instructions for comparing the bids to bid acceptance criteria;
   fifth instructions for sending a bid acceptance to the potential team member if the bid of the potential team member meets bid acceptance criteria; and
   sixth instructions for communicably connecting remote team members to allow for project collaboration between team members.

7. The computer program product as recited in claim 6, wherein the bid is created by the potential team member selecting at least one option from a presentation of at least two options.

8. The computer program product as recited in claim 6, wherein the bid comprises at least one of a compensation amount, a compensation type, functions to be performed, a skill set of the potential team member, experience level of the potential team member, and an educational background of the potential team member.

9. The computer program product as recited in claim 6, further comprising:
   sixth instructions for notifying a team member corresponding to an accepted bid of the identities of other team members on the project.

10. The computer program product as recited in claim 6, further comprising:
    sixth instructions for receiving deliverables from the team member; and
    seventh instructions for making at least one payment of compensation to the team member.

11. A system for assembling a project team, the system comprising:
    first means for notifying potential team members with appropriate qualifications of a project for which team members are needed wherein the potential team members are identified based on information contained in a database of potential team members;
    second means for requesting bids from the notified potential team members;

third means for receiving bids from the potential team members;

fourth means for comparing the bids to bid acceptance criteria;

fifth means for sending a bid acceptance to the potential team member if the bid of the potential team member meets bid acceptance criteria; and sixth means for notifying a team member corresponding to an accepted bid of the identities of other team members on the project.

12. The system as recited in claim 11, wherein the bid is created by the potential team member selecting at least one option from a presentation of at least two options.

13. The system as recited in claim 11, wherein the bid comprises at least one of a compensation amount, a compensation type, functions to be performed, a skill set of the potential team member, experience level of the potential team member, and an educational background of the potential team member.

14. The system as recited in claim 11, further comprising:

sixth means for communicably connecting remote team members to allow for project collaboration between team members.

15. The system as recited in claim 11, further comprising:

sixth means for receiving deliverables from the team member; and seventh means for making at least one payment of compensation to the team member.

* * * * *